E. C. HINZEY.
Mode of Making Emery-Rubbers for Buhr Mill-Stones.
No. 161,414. Patented March 30, 1875.
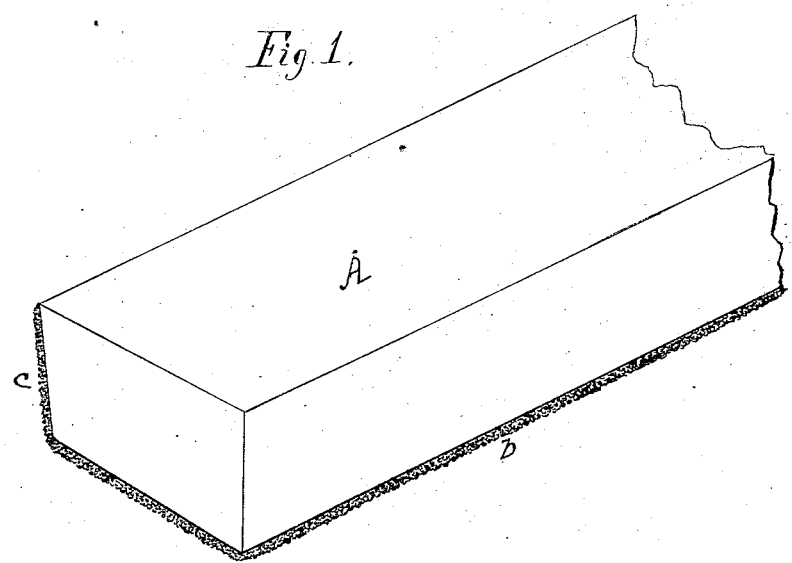
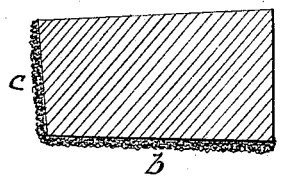 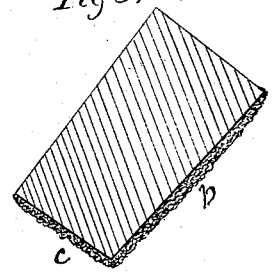

UNITED STATES PATENT OFFICE.

ELIAS C. HINZEY, OF IOWA CITY, IOWA.

IMPROVEMENT IN MODES OF MAKING EMERY-RUBBERS FOR BURR MILLSTONES.

Specification forming part of Letters Patent No. 161,414, dated March 30, 1875; application filed August 10, 1874.

*To all whom it may concern:*

Be it known that I, ELIAS C. HINZEY, of Iowa City, county of Johnson and State of Iowa, have invented an Improved Process in the Manufacture of Furrow and Face Rubbers for Burr Millstones; and I do hereby declare that the following is a full, clear, and exact description thereof, reference being had to the accompanying drawings making part of this specification, which show an implement to which my composition is applied.

My invention consists in an improved process, whereby a cheap, durable and effective implement for removing the gluten from burr millstones, and also for rubbing the furrows smooth after dressing with a pick, is produced.

It is well known by millers that, after stones have been run on various kinds of grain for a considerable time, they become glazed with a gluten of the grain, and that the gluten interferes with the grinding and dressing of the stones after they become dull. This gluten, before dressing with the mill-pick, it is desirable to have removed from the stone.

It frequently occurs in some States that wheat will have garlic grown with it, and which it is impossible to separate fully from the wheat, which every miller knows will badly paste the stone. This paste the broad side of the rubber will effectually remove by rubbing. The use of acids now practiced to remove this paste, as well as the gluten, is considered injurious to the stone by the best-informed millers. Moreover, the furrows of the stone, after being dressed with the pick, are covered, more or less, with fine projecting edges and lumps of stone, which, if not removed, will become detached in the subsequent act of grinding, and mingle with the meal, and so impart thereto what is known as "grit," and also cut up the bran into small particles, thereby causing "gritty" and "specky" flour.

By my invention this "gluten" can be removed from the face of the stone preparatory to dressing, and also from the furrow, thus freshening up the furrows when they become glazed, also smoothing the furrow more effectually than can be done entirely with the pick.

The emery is prepared and applied to the wood A by the following improved process, which not only causes the sheet of emery to securely adhere to the wood, but imparts great power to the emery-sheet to resist the disintegrating action of the weather, as well as resist the abrading effect or wearing away of the face of the emery-sheet in the act of use. I mix glue and chalk, and boil in milk or water; I then mix said preparation with the emery, and put it in molds and press to a compact mass of the proper thickness; I then take it out of the molds and place on boards to partly dry; then fasten the emery-sheet to the stick A with glue, and press it firmly to the stick. After this I wash the emery-sheet $b$ with a solution of alum, in the proportion of one and a half pound to the gallon of soft water. I then allow it to thoroughly dry, after which it is ready for market.

I do not claim, broadly, an emery-stick for dressing the furrows of millstones; but What I do claim is—

The improved process of preparing emery, to be used as a furrow and face rubber for millstones, by boiling a mixture of glue and chalk in milk or water, after which the emery is mixed with the boiled glue and chalk, and then pressing such compound into sheets of proper dimensions, which sheets are thereafter treated to a solution of alum, substantially as described.

ELIAS C. HINZEY.

Witnesses:
E. H. CLINTON,
M. D. WOOD.